C. M. TAYLOR & W. R. SHEARER.
HEATING DEVICE.
APPLICATION FILED JUNE 8, 1916.

1,241,167.

Patented Sept. 25, 1917.

Witnesses

Inventors
Carroll M. Taylor.
Walter R. Shearer.
By Joshua R. H. Potts
Their Attorney

UNITED STATES PATENT OFFICE.

CARROLL M. TAYLOR, OF COATESVILLE, AND WALTER R. SHEARER, OF HANOVER, PENNSYLVANIA.

HEATING DEVICE.

1,241,167.     Specification of Letters Patent.    Patented Sept. 25, 1917.

Application filed June 8, 1916. Serial No. 102,374.

*To all whom it may concern:*

Be it known that we, CARROLL M. TAYLOR and WALTER R. SHEARER, citizens of the United States, residing at Coatesville, county of Chester, and State of Pennsylvania, and Hanover, county of York, and State of Pennsylvania, have invented certain new and useful Improvements in Heating Devices, of which the following is a specification.

Our invention consists of an improved form of heating device, and is particularly serviceable for use on automobiles or other vehicles employing internal combustion engines, and which derive their power from the explosion of gases within piston cylinders.

One of the objects of our invention is to utilize the hot exhaust gases as they are expelled from the engine and pass these gases through a radiator within the automobile.

Another object is to control the passage of the exhaust gas so that it will efficiently heat the radiator without producing noise.

A still further object is to so control the heated exhaust gas for heating purposes so that no back pressure will result in the engine, thus preventing the choking of the engine which would otherwise occur if the exhaust was not permitted to freely pass to the atmosphere.

A further object is to so construct our invention that it may be quickly and cheaply installed in automobiles or power driven vehicles of any description.

A further object is to provide the device with means for operating valves therein, so that the exhaust may be cut off from the radiator or that a part of the exhaust may be caused to circulate through the radiator.

A further object is to so construct the device that a free circulation will be set up within the radiator without the inclusion of expensive or complicated mechanisms.

These objects, and other advantageous ends which will be described hereinafter, we attain in the following manner, reference being had to the accompanying drawings in which—

Figure 1:
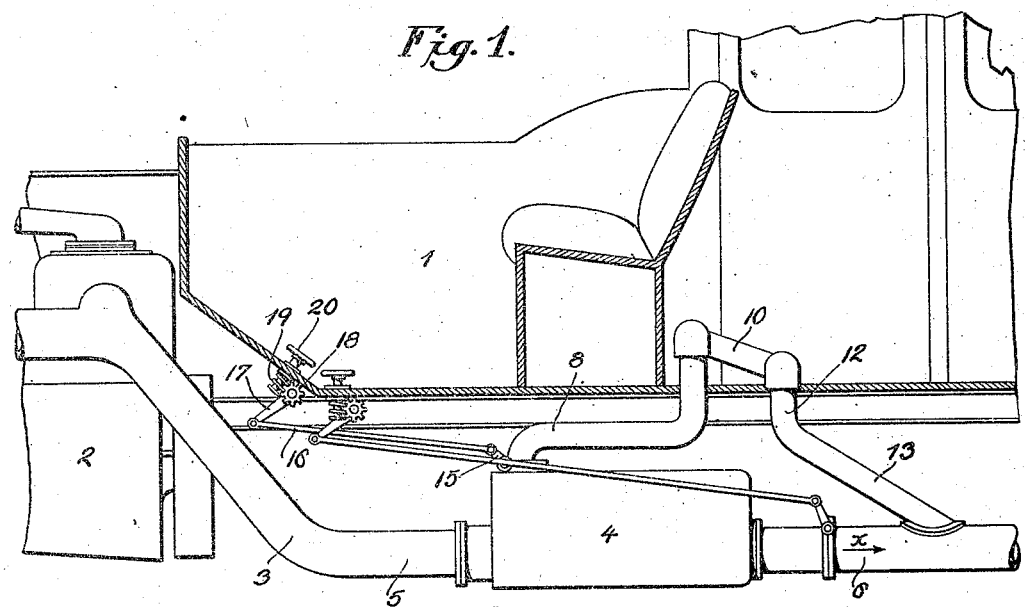
Figure 1 is a sectional elevation of a portion of an automobile showing our invention thereon.

Referring to the drawings, 1 represents the body of an automobile having an engine 2, and 3 is the exhaust pipe through which the hot exhaust gas passes outwardly from the engine.

Figure 2:
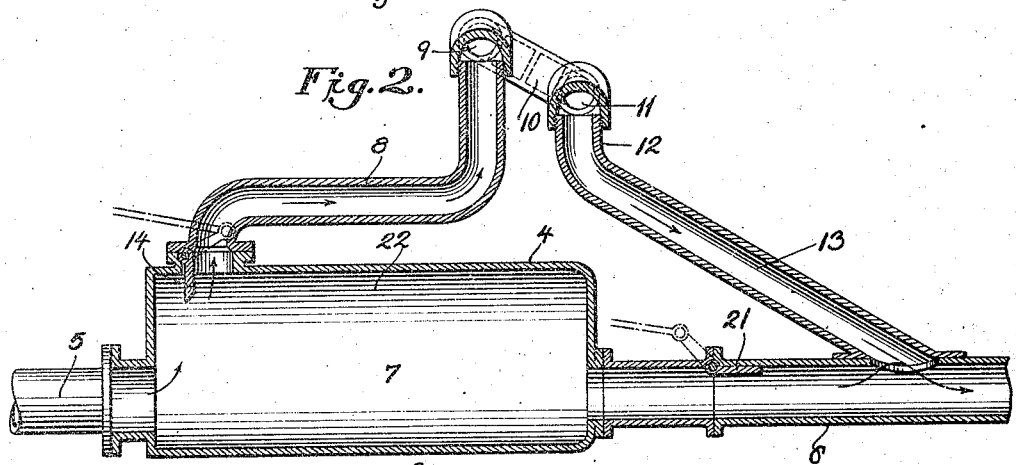
Fig. 2 is an enlarged sectional view through the principal elements of our invention.

Considering Figs. 1 and 2 of the drawings, an inclosed tank 4 is interposed between the sections 5 and 6 of the exhaust pipe 3, and this tank 4 is of greater cross section than the exhaust pipe 3, so as to provide an enlarged chamber 7 into which the gas after passing through the section 5 of the exhaust pipe 3 enters.

A pipe 8 leads outwardly from the top of the tank 4, and connects with the top passage 9 of a radiator 10. This radiator 10 may be of any construction, but is preferably arranged at a slight incline so as to provide a foot rest for the occupants of the automobile, and has an outlet passage 11 which is connected with the upper end of a pipe 12.

The portion 13 of this pipe 12 is inclined and enters the section 6 of the exhaust pipe at a slant, said slant being in the general direction of the passage of gases through the section 6 as indicated by the arrow in Fig. 1, so that any gas passing downwardly through the pipe 12 will enter the section 6 of the exhaust pipe 3 and continue in the direction of the exhaust as indicated by said arrow.

A valve 14 is pivotally connected between the opening in the upper portion of the tank 4 and the adjacent end of the pipe 8, and this valve is operated, through the medium of a crank arm 15, link 16, lever 17, and intermeshing worm wheel and worm 18 and 19 respectively, by a hand wheel 20 conveniently located within the body of the automobile, so that a rotation of said hand wheel will cause the valve 14 to move into an open or closed position to permit or cut off communication between the radiator 10 and the chamber 7.

Another valve 21 is pivotally mounted within the section 6 of the exhaust pipe 3 at a point intermediate of the tank 4 and the entrance of the pipe 12 with the section 6. This valve 21 is moved by elements similar to those described in connection with the valve 14, so that it may be moved at right angles to the pipe section 6, or at any other angle desired.

Figure 3:
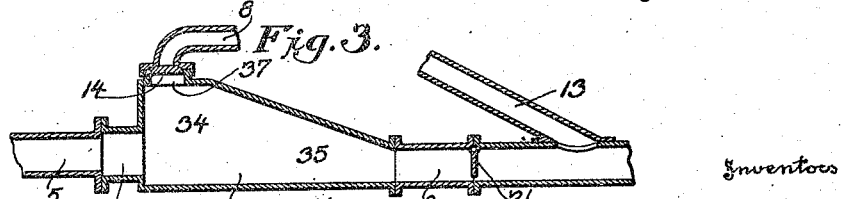
Fig. 3 is a fragmentary section showing a modified form of the elements shown in Fig. 2.

When moved into a position at right angles with the pipe and the valve 14 is moved into its open position, the greater part of the gas going into the chamber 7 will be compelled to pass through the radiator. However, under ordinary conditions, this valve 21 may be kept fully open as may also the valve 14, and the construction is such that a sufficient amount of heated gas will pass through the radiator to properly heat it, and the remainder of the gas will pass through the section 6 to the atmosphere. At times when it is desired to secure a rapid initial heating of the radiator, the valve 21 may be closed or partially closed, thereby compelling a greater amount of the exhaust gas to pass through the pipe 8 and radiator 10. However, after the radiator has been heated to a desired degree, the valve 21 should be moved to its full open position, since it will be noted that the ordinary operating condition of our invention, for example as illustrated in Fig. 3 of the drawing, is with the valves 14 and 21 fully open and under such condition there is a free circulation of the heated gas through the radiator.

By providing the large chamber 7 and having the portion 13 of the pipe 12 extending at an angle as above described, a free circulation of the heated gas is secured through the radiator, and the chamber 7 within the tank 4 acts as a "calming chamber" which permits the intermittent discharges of the gas from the engine to spread out and combine due to their expansive force, and as the pipe 8 communicates with the upper portion of the chamber 7, the heated gas rises to the top of said chamber and passes upwardly into the radiator.

The entrance of the sections 5 and 6 of the exhaust pipe 3 is preferably made adjacent the bottom of the chamber 7, so that there is a space 22 which acts as a reservoir for a certain amount of the heated gas, thus permitting the latter-mentioned portion of the gas to freely pass upwardly through the pipe 8. The other portion of the gas within the chamber 7 will pass outwardly through the section 6, and in doing so will tend to suck the gas downwardly through the portion 13 of the pipe 12, thereby accelerating the circulation within the radiator, and insure an efficient heating of the radiator without choking the exhaust pipe.

It will be noted that the tank 4 will also act in the capacity of a muffler to deaden the noise which would otherwise occur from the direct discharges of the gas from the engine. Therefore the tank 4 acts in two capacities as a calming chamber of which the upper portion provides a reservoir for a certain amount of the heated gas to pass through the radiator, and also acts as a muffler to deaden the sound of the discharge.

Instead of having the tank 4 of the shape shown in Figs. 1 and 2, it may be made as shown at 33 in Fig. 3 which provides a relatively large chamber 34 which tapers at 35 to the diameter of the section 6 of the exhaust pipe.

The inlet section 5 of the exhaust pipe is in communication with the opening 36 in the casing 33 at the large end thereof. The pipe 8 is in communication with an opening 37 in the extreme uppermost portion of the tank 33, and extends to the radiator, the latter also having the pipe portion 13 leading at an angle to the section 6 in the same manner as shown in connection with Figs. 1 and 2 of the drawing.

In some instances, the construction shown in Fig. 3 may be preferred to the construction shown in Fig. 2, since the tapered upper wall of the tank 33 causes a certain amount of the heated gas to pocket adjacent the opening 37 and readily pass upwardly through the pipe 8 when its valve is open.

If it is desired to cut off the heat to the radiator 10, the wheel 20 may be turned which causes a movement of the lever 17, link 16, and crank arm 15 to move the valve 14 into its closed position.

By having the worm and worm wheel connection for operating the valves, there is practically no possibility of these valves being opened or closed by the vibration of the car or engine, since it would be necessary for the worm to rotate before the worm wheel could move even to the extent of one tooth.

In certain of the claims we have used the term "outlet section of the exhaust pipe proper" by which is meant the outlet section of the exhaust pipe independent of any muffler or other device. However, it will be understood that a muffler of any type may be added to the exhaust pipe if desired.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention what we claim as new and desire to secure by Letters Patent is:

1. The combination with an internal combustion engine of an exhaust pipe, a tank providing a relatively large chamber, said tank being positioned between and in communication with two sections of the exhaust pipe, a closed radiator having an inlet and an outlet passage, a pipe communicating with the inlet passage of the radiator and with the chamber, a second pipe of smaller cross section than the outlet section of the exhaust pipe and communicating with the outlet passage of the radiator and with the outlet section of the exhaust pipe proper within its length, and a valve for regulating the passage of gas through the radiator and being operative independently of the exhaust pipe so as not to prevent passage of the gas therethrough, substantially as described.

2. The combination of a tank providing a tapering chamber and having an inlet passage entering the larger portion of said chamber, and an outlet passage at the narrow portion of said chamber, an exhaust pipe communicating with the inlet passage of said tank to supply heated exhaust gas thereto, and a second exhaust pipe communicating with the outlet passage of said tank to receive the gas as it passes through said chamber, a radiator having an inlet and an outlet passage, a pipe connecting the large portion of said chamber with the inlet passage of the radiator, and a second pipe connecting the outlet passage of the radiator with said second exhaust pipe, substantially as described.

3. The combination of a tank providing a tapering chamber and having an inlet passage entering the larger portion of said chamber, and an outlet passage at the narrow portion of said chamber, an exhaust pipe communicating with the inlet passage of said tank to supply heated exhaust gas thereto, and a second exhaust pipe communicating with the outlet passage of said tank to receive the gas as it passes through said chamber, a radiator having an inlet and an outlet passage, a pipe connecting the large portion of said chamber with the inlet passage of the radiator, a second pipe connecting the outlet passage of the radiator with said second exhaust pipe, said pipe which connects said outlet passage of the radiator intersecting said second exhaust pipe at an incline extending in the general direction of movement of the gas within said second exhaust pipe, substantially as described.

4. In a heating system, the combination with an exhaust pipe, of means for collecting the lighter products of combustion passing through the pipe without interfering with the passage through the pipe of the heavier products of combustion, a radiator, connecting means of relatively small capacity between the radiator and the collector means, an outlet provided for the radiator, and means for controlling passage through said radiator.

5. The combination of a tank providing an expansion chamber, an exhaust pipe communicating with said chamber, a radiator, an inlet pipe communicating with the expansion chamber and with the radiator, said exhaust pipe having an outlet section also communicating with the chamber, valves for respectively controlling the passage of gas through the inlet pipe to the radiator and through said outlet section of the exhaust pipe, and an outlet pipe joining the radiator to the outlet section of the exhaust pipe at a point beyond the expansion chamber and the valves, substantially as described.

6. The combination with an internal combustion engine, of an exhaust pipe including two sections, a tank providing a relatively large chamber, said tank being positioned between and in communication with both of said exhaust pipe sections, a closed radiator having an inlet and an outlet passage, a pipe communicating with the inlet passage of the radiator and with the chamber, and a second pipe of smaller cross section than the outlet section of the exhaust pipe, said second pipe leading from the outlet passage of the radiator and intersecting the outlet section of the exhaust pipe within its length, substantially as described.

In testimony whereof we have signed our names to this specification in the presence of two subscribing witnesses.

CARROLL M. TAYLOR.
WALTER R. SHEARER.

Witnesses for Carroll M. Taylor:
  RHODA E. GILLIES,
  CHAS. E. POTTS.

Witnesses for Walter R. Shearer:
  D. GUY HOLLINGER,
  C. B. WIRT.